United States Patent
Romanenko

(10) Patent No.: US 9,483,827 B2
(45) Date of Patent: Nov. 1, 2016

(54) METHOD OF OBJECT ORIENTATION DETECTION

(71) Applicant: Apical Ltd, London (GB)

(72) Inventor: Ilya Romanenko, London (GB)

(73) Assignee: Apical Ltd., Loughborough (GB)

( * ) Notice: Subject to any disclaimer, the term of this patent is extended or adjusted under 35 U.S.C. 154(b) by 0 days.

(21) Appl. No.: 14/601,095

(22) Filed: Jan. 20, 2015

(65) Prior Publication Data

US 2015/0206311 A1    Jul. 23, 2015

(30) Foreign Application Priority Data

Jan. 20, 2014    (GB) .................................. 1400941.9

(51) Int. Cl.
| | |
|---|---|
| G06K 9/62 | (2006.01) |
| G06T 7/00 | (2006.01) |
| G06K 9/00 | (2006.01) |
| G06K 9/46 | (2006.01) |

(52) U.S. Cl.
CPC ......... *G06T 7/0048* (2013.01); *G06K 9/00248* (2013.01); *G06K 9/4614* (2013.01); *G06K 9/6276* (2013.01); *G06T 2207/20081* (2013.01); *G06T 2207/30201* (2013.01)

(58) Field of Classification Search
None
See application file for complete search history.

(56) References Cited

U.S. PATENT DOCUMENTS

| 6,915,025 | B2 * | 7/2005 | Wang | G06K 9/00248 382/165 |
|---|---|---|---|---|
| 7,194,114 | B2 * | 3/2007 | Schneiderman | G06K 9/527 382/118 |
| 7,684,954 | B2 * | 3/2010 | Shahabdeen | A61B 5/1126 702/141 |
| 7,848,548 | B1 * | 12/2010 | Moon | G06K 9/00281 382/100 |
| 8,515,126 | B1 * | 8/2013 | Medasani | G06K 9/00369 382/100 |
| 9,251,400 | B2 * | 2/2016 | Shiozaki | G06K 9/00228 |
| 2006/0120604 | A1 * | 6/2006 | Kim | G06K 9/00228 382/181 |
| 2009/0297038 | A1 | 12/2009 | Ishikawa et al. | |

FOREIGN PATENT DOCUMENTS

JP    09145323 A1    7/2009

* cited by examiner

*Primary Examiner* — Daniel Mariam
(74) *Attorney, Agent, or Firm* — EIP US LLP

(57) ABSTRACT

A method of determining an orientation of an object within an image. The method determines the responses of at least two classifiers in at least one region of the image corresponding to the object. The classifiers have been trained to identify a given object in different specific orientations. The orientation of the object is determined as an average of the specific orientations, weighted by the responses of their respective classifiers.

9 Claims, 7 Drawing Sheets

METHOD OF OBJECT ORIENTATION DETECTION

CROSS-REFERENCE TO RELATED APPLICATIONS

This application claims priority under 35 U.S.C. §119 to GB Patent Application No. 1400941.9, filed Jan. 20, 2014, the entire contents of which is hereby incorporated herein by reference in its entirety.

BACKGROUND OF THE INVENTION

1. Field of the Invention

The present invention relates to a method of determining the angle of orientation of an object in an image.

2. Description of the Related Technology

It is frequently desirable to estimate the angle or orientation of an object in an image or video sequence with respect to the camera. For example, the ability of a robotic hand to grasp a three-dimensional object accurately depends on its ability to estimate the relative orientation of that object.

Various methods for determining the orientation angle of an object are known in the art. For example, these methods may extract a sparse representation of an object as a collection of features such as edges and corners, and then analyze the relative orientation of these features to determine an overall orientation angle for the object. However, these techniques are often not robust to variations in object shape and topography, or to variations in image quality such as noise and non-uniform illumination.

SUMMARY

According to a first aspect of the present invention, there is provided a method of determining an orientation of an object within an image, the method comprising:

determining responses of at least two classifiers in a region of the image corresponding to the object, the classifiers having been trained to identify a given object in different specific orientations;

determining the orientation of the object as an average of the specific known orientations, weighted by the responses of their respective classifiers.

The method classifies a region of an image according to classifiers. Each classifier is trained to detect an object in a specific orientation, the orientations of different classifiers usually being different. The application of the classifiers to the region produces a response for each orientation. The responses are then used to produce a weighted average of the various orientations. The resultant weighted average is a more accurate determination of the orientation than typically achievable by known methods. The determined orientation is robust to variations in object shape and topography and has a reduced sensitivity to variations in image quality.

The invention further relates to an apparatus for carrying out the method and a computer program for determining the orientation, which may be implemented in hardware of software in a camera or computer.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Object identification and classification is the process by which the presence of an object in an image may be identified, and by which the object may be determined to belong to a given class of object. An example of such an object is a human face in an image of a group of people, which may be determined to belong to the class of human faces. The object may be grouped in for example three classes: a face oriented to the left, to the right, and to the front of the image. An object in an image may be identified and classified using one of many methods, well known to those skilled in the art. Such methods include face detection algorithms, histograms of oriented gradients, and background segmentation.

Figure 1:
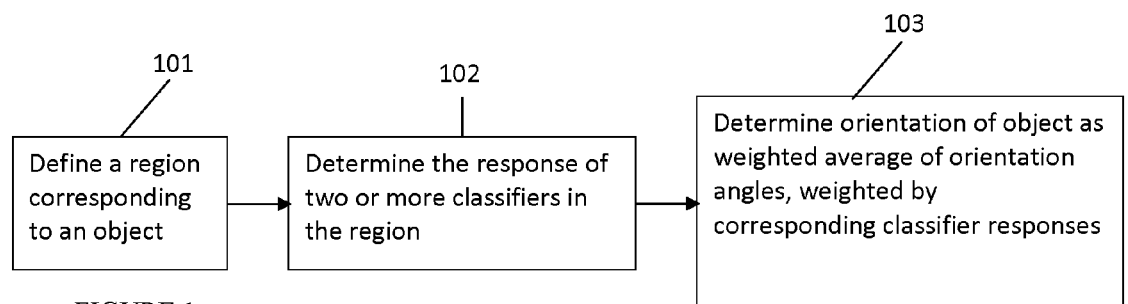
FIG. 1 shows a method for determining the orientation of an object.

FIG. 1 shows schematically a method according to one embodiment, in which the orientation of an object in an image may be determined. A region in the image may be determined to correspond to the object 101. The response of two or more classifiers in this region may then be determined 102, the classifiers having been previously trained on images of objects in different orientations. The orientation of the object may then be determined 103 as a weighted average of the orientations for which the classifiers have been trained, the orientations being weighted by the corresponding classifier responses. The orientation may be expressed for example as an angle with respect to a predetermined direction, such as the viewing direction, or as a vector.

Figure 2:
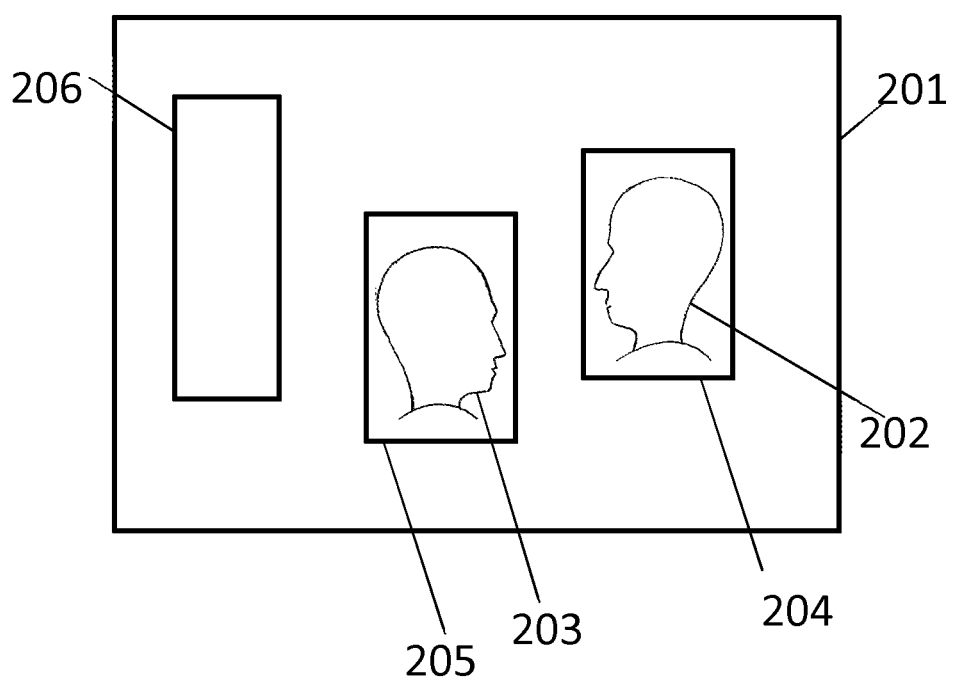
FIG. 2 shows an image containing two objects.

FIG. 2 shows an image 201 containing objects 202, 203, which may be human faces. An identification and classification method may analyze multiple regions 204, 205, 206 within the image with a previously trained classifier, to determine how closely they correspond to objects on which the classifier has been trained. The regions may be obtained by systematically scanning over the image, producing multiple regions of varying size and position. A region where the classifier has a response larger than zero, may be a region in which an object on which the classifier has been trained, is present.

As an example, a first, second and third classifier may have been trained on images containing faces oriented towards the left, the right and the front of the image, respectively. If a region gives a positive response for at least one of these classifiers, the region will include a face. Hence, region 206 in FIG. 2, which does not contain a face, will not give a positive response for any of the classifiers. The regions 204 and 205 include a face and will give a response larger than zero for at least one of the classifiers. If the object 202 is a face oriented to the left and the object 203 a face oriented to the right, the first classifier will determine a higher degree of correspondence for the region 204 which corresponds to a face oriented to the left than for the region 205 and the region 206 which do not contain a face oriented to the left. In this manner, the identification and classification method may identify an object 202 as being located within a region 204, and classify it as a face oriented to the left.

Figure 3:
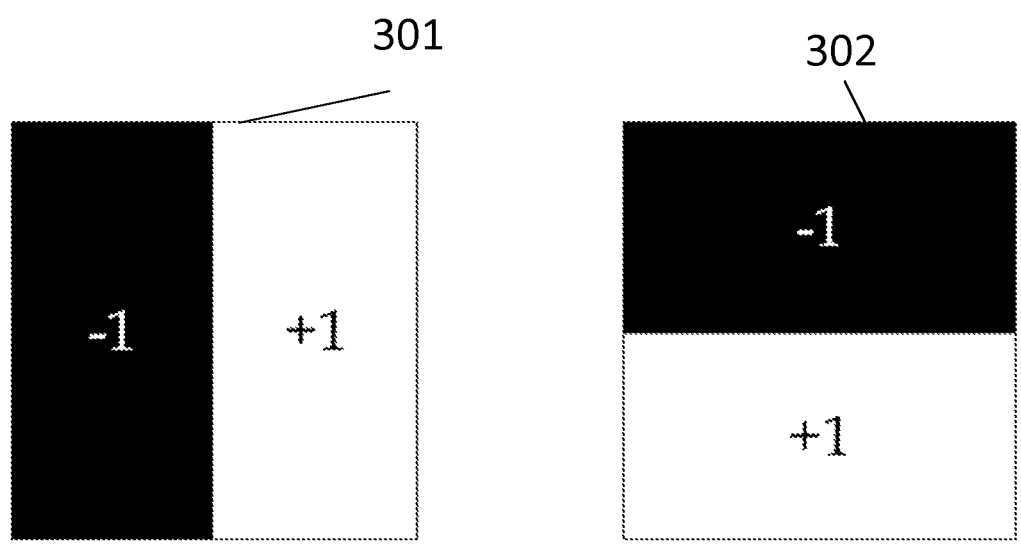
FIG. 3 shows Haar classifiers for vertical and horizontal lines.

According to one embodiment, a human face in an image may be identified using a facial detection routine employing a Haar classification scheme. This method involves the analysis of a region of an image with a previously trained classifier, to determine a response. For example, the entire image or an identified region may be divided into multiple zones, for example a grid of zones, with the response of feature detectors being determined in each zone. The feature detectors may, for example, be Haar edge detectors corresponding to edges at various angles. FIG. 3 shows two Haar classifiers, one for detection of vertical 301 and one for detection of horizontal 302 edges. These are compared to a zone within a region; for example the vertical edge Haar classifier 301 will be more similar to a zone containing a vertical edge between a light region and a dark region than to a zone not containing such an edge.

Another type of classifier that can be used in the method is a support vector machine. A support vector machine is a known kind of classifier or algorithm used to compare part of an image with a trained template and measuring the overlap to decide if the object is there or not, as described in for example the article 'Support-Vector Networks' by Cortes and Vapnik, Machine Learning, 20, 273-297 (1995), Kluwer Academic Publishers.

The response of each feature detector may then be compared to an expected weight for that feature detector in that zone, the expected weights being obtained by training the classification routine on images containing known objects in specific known orientations. An overall response can then be calculated, which indicates the degree of correspondence between the responses of the feature detectors and their expected weights in each zone. Thus the classifier may comprise multiple feature detectors.

A known method of face detection use a Haar classification scheme, which forms the basis for methods such as that due to Viola and Jones. Such a method may typically involve the detection of a face in one or more poses, in this case a face directed to the left, to the right, and to the front. The method compares a region of an image with a previously trained classifier to obtain a response which is in turn used to decide whether a face is present in one of the target poses.

This response to a given pose is denoted as $S_{pose}$. It is obtained by defining a rectangular detection window consisting of M×N zones. Each zone may cover one or more pixels of the image. In each zone response values $R_i$ are calculated based on a set of feature detectors. These may be for example Haar edge detectors corresponding to edges at 0 (horizontal), 45, 90 and 135 degrees, $H_0$, $H_{45}$, $H_{90}$, $H_{135}$ respectively, such that for example the response at zone (m, n) for 'i' degrees is $$R_i(m,n) = \text{Conv}(H_i, \text{Image}(m,n))$$

where Conv is a convolution, $H_i$ is the Haar filter kernel, and Image is the image luminance data for the zone (m, n).

The training of the object detector produces a map of expected weights for feature detectors in each zone for a chosen pose: $\{M_{pose,0}(m,n), M_{pose,45}(m,n), M_{pose,90}(m,n)$ and $M_{pose,135}(m,n)\}$. Typically three poses are trained for: Front, Left and Right.

In each zone (m,n) a score P is assigned for each feature, representing the likelihood that the feature is present, with increasingly large positive values indicating an increasing likelihood that the feature is present, while increasingly negative values indicating an increasing likelihood that the feature is not present:

$$P_{pose}(m,n) = \Sigma_i R_i(m,n) * M_{pose,i}(m,n)$$

Finally, the response $S_{pose}$ of a trained object detector within the given detection window is $$S_{pose} = \Sigma_{m,n} P_{pose}(m,n)$$

The detection window may cover the entire image or a selected part of the image.

In a typical method a cluster of detections is used to detect an individual object in the image, each detection corresponding to a different offset of the window position with respect to the object and/or a different size scale as further described below.

The classification scheme may alternatively use, for example, the well-known techniques of an AdaBoost algorithm, a support vector machine, or a k-nearest neighbor's algorithm.

Figure 4:
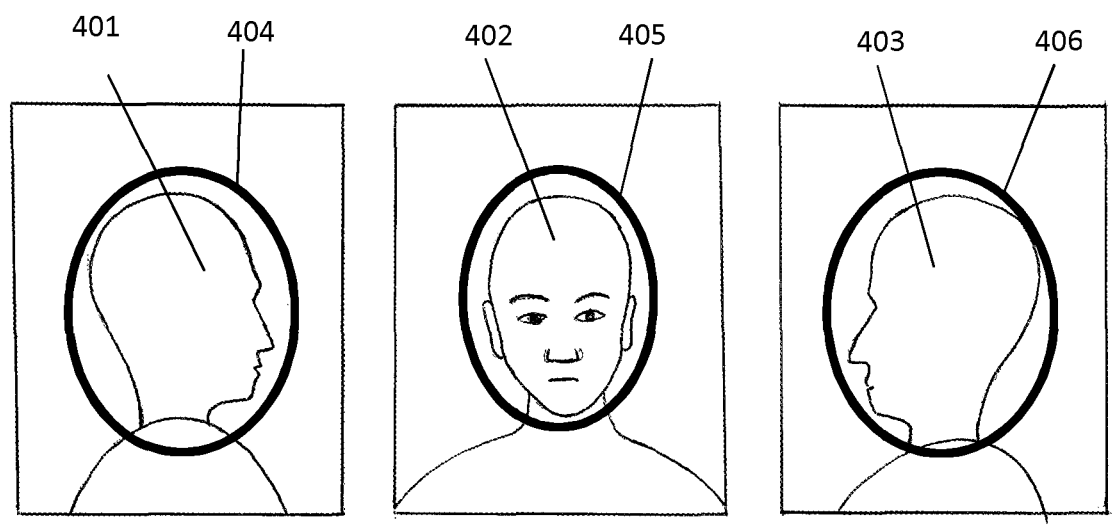
FIG. 4 shows face detection using classifiers trained to detect different orientation angles.

The response quantifies the degree of correspondence between the region of the image and the trained object. For an example, the method may employ classifiers for faces directed to the front, to the left and to the right of the image. FIG. 4 shows three orientations of a head, namely right-facing 401, front-facing 402, and left-facing 403. In each case a classifier corresponding to the relevant orientation has been used to identify a region 404, 405, 406 of highest response corresponding to a face in that orientation.

Figure 5:
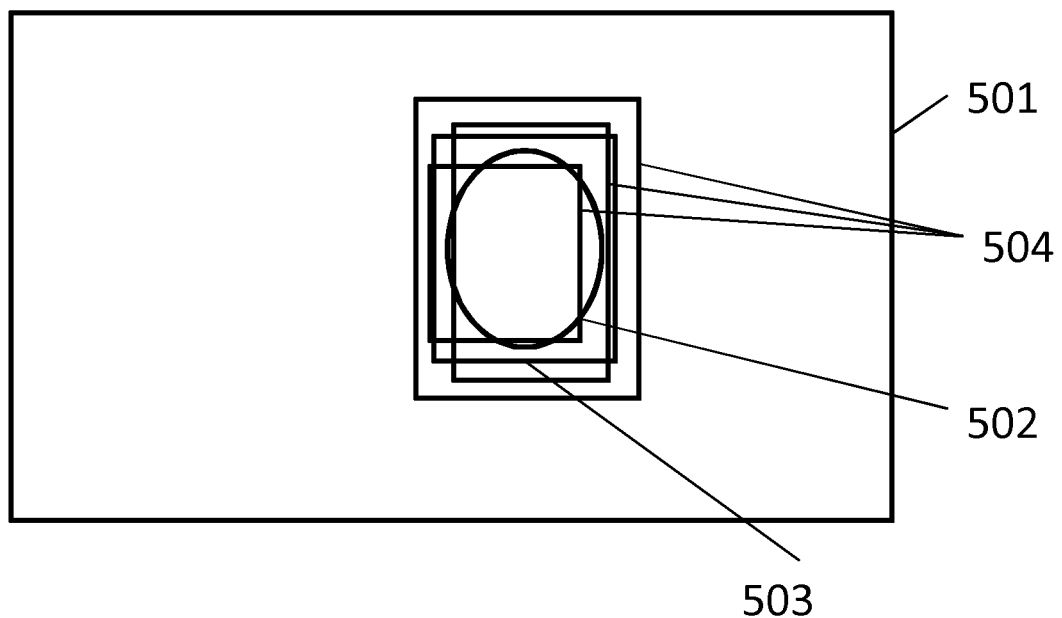
FIG. 5 shows a cluster of multiple regions corresponding to one object.

According to some embodiments, several regions may correspond to a single object in the image, with the various regions being offset from each other in position and size within the image. This is shown in FIG. 5, which depicts an image 501 containing an elliptical object 502, which may for example be a human face. The region 503 may have the highest classifier response, but typically a high response, i.e a response larger than zero, will also be observed for multiple other regions 504 which are close in size and position. These multiple regions with high response may be taken together as a 'cluster'. The weighted average is calculated over all regions of the cluster, which may improve the accuracy of the determined orientation.

In the prior art, such a response determines the presence or absence of a particular object: a response>0 is typically interpreted as a detected object while a response<0 is typically interpreted as the absence of the object. For example, a response<0 for all classifiers would imply that no face is present, whereas a response>0 for the left-facing classifier and response<0 for the right-facing and front-facing classifiers would imply that a face is present and oriented towards the left of the image. However, this may not be sufficiently accurate: for example, manipulation of a robot hand to grasp an object may require an accuracy of the orientation within a few degrees.

The accuracy may be improved relative to that achieved by known methods by constructing a weighted average of the orientation angles of each classifier, the orientation angles being weighted by the response of that classifier. A specific orientation for which a classifier has been trained may be referred to as a 'pose', for example left-facing and right-facing. For a number of poses, each pose having orientation angle $\theta_{pose}$ weighted by a corresponding classifier response $S_{pose}$, this weighted average A may be expressed mathematically as $$A = \frac{\sum_{pose} S_{pose} \theta_{pose}}{\sum_{pose} S_{pose}},$$

where the sums exclude poses where $S_{pose} \leq 0$; i.e. poses not present are excluded from the weighted averaging operation. In other words, the weighted average excludes specific orientations of classifiers having a response smaller than zero. The parameter A is the orientation of the object as determined by the method, expressed as an angle.

In the embodiment in which a cluster of multiple regions is identified for each image, all of the regions within each cluster may be included within the weighted average. If the response of the $j^{th}$ member of a cluster of multiple detections corresponding to a given pose is termed $S_{pose,j}$, the weighted average over all poses may be expressed mathematically as $$A = \frac{\sum_{pose,j} S_{pose,j} \theta_{pose}}{\sum_{pose,j} S_{pose,j}},$$

where the sums exclude the poses where $S_{pose,j} \leq 0$.

Figure 6:
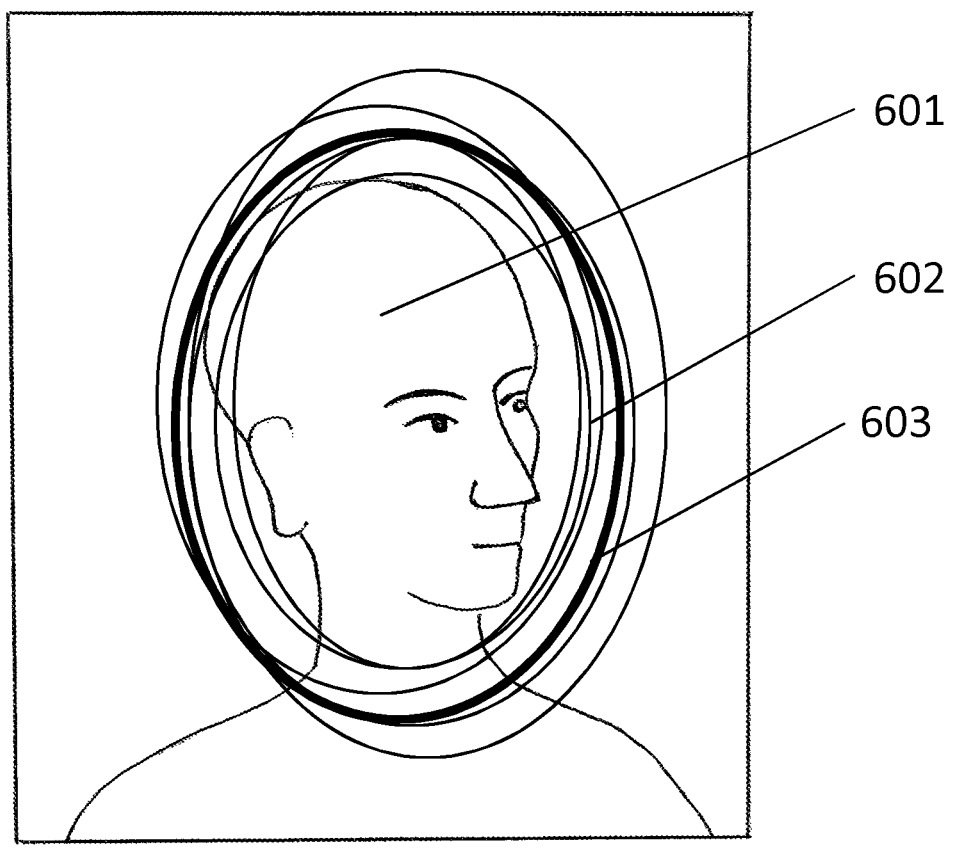
FIG. 6 shows face orientation determination using a weighted sum of multiple classifiers.

A weighted average constructed in this manner may typically be accurate as an estimate of the orientation angle to within a few degrees. FIG. 6 shows an image of a head 601 oriented partially to the front and partially to the right of the image. Classifiers corresponding to different orientations have been used to identify multiple regions 602 corresponding to high responses for different orientation angles. The orientation of the head 601 lying within the region of strongest response 603 may thus be determined as a weighted average. In this case, the orientation angle is determined to be 68 degrees.

Figure 7:
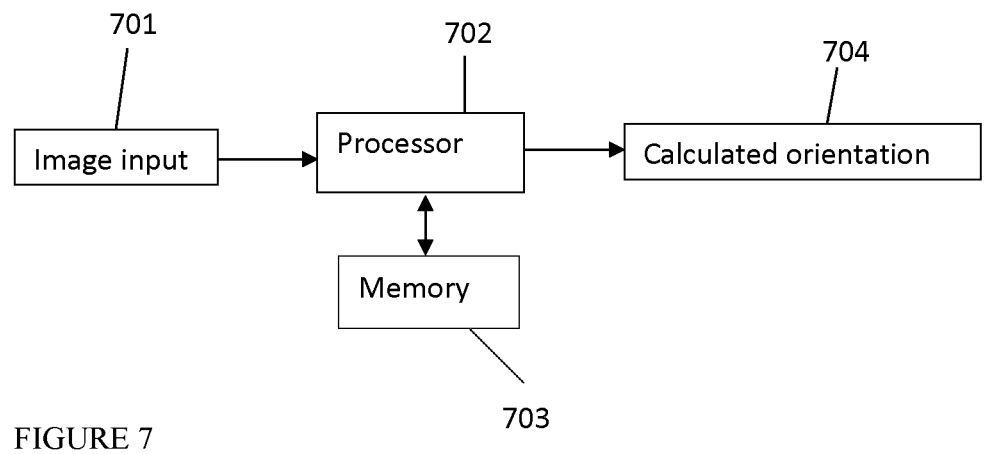
FIG. 7 shows an apparatus for implementing an object orientation detection method.

An apparatus for carrying out the above described method is shown in FIG. 7. An image is input 701 to a processor 702 and a memory 703 which includes computer program instructions. The instructions are configured to cause the processor to determine the orientation of an object in the image in the manner described above. The orientation is then output 704. The apparatus may for example be implemented in a camera or computer, and the image may be input from a camera sensor or from a memory. The output may for example be to a screen, or stored in memory.

The invention may be implemented in a computer program product comprising a non-transitory computer readable storage medium having computer readable instructions stored thereon, the computer readable instructions being executable by a computerized device to cause the computerized device to determine the orientation of an object in an image in the manner described above.

The above embodiments are to be understood as illustrative examples of the invention. Further embodiments of the invention are envisaged. For example, the method is not only applicable to facial detection algorithms, but may be used to determine the orientation of any object which classifiers can be trained to detect in two or more orientations. The method can be used for determining the orientation of a single object in an image but also for the orientation of multiple objects in an image. The images may be still images or frames of a video. In the latter case the method can be used to provide a time evolution of the orientation of an object in the video. The invention may also be implemented in hardware or software, for example in a camera or computer. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of determining an orientation of an object within an image, the method comprising:
   determining responses of at least two classifiers in at least one region of the image corresponding to the object, the classifiers having been trained to identify the given object in different specific orientations; and
   determining the orientation of the object as an average of the specific orientations, weighted by the responses of their respective classifiers, excluding specific orientations of classifiers having a response smaller than zero.

2. The method according to claim 1, comprising identifying the at least one region as a region with a response larger than zero of at least one classifier.

3. The method according to claim 1, comprising identifying the at least one region using a face detection algorithm.

4. The method according to claim 1, comprising identifying a cluster of regions for the object,
   the cluster comprising at least two regions with a response larger than zero for at least one classifier, the regions having at least different sizes or different positions within the image;
   and in which the weighted average is calculated over all regions of the cluster.

5. The method according to claim 1, in which at least one of the classifiers is a Haar classifier.

6. The method according to claim 1, in which at least one of the classifiers is a k-nearest neighbor's algorithm.

7. The method according to claim 1, in which at least one of the classifiers is a support vector machine.

8. Apparatus for processing an image, the apparatus comprising:
   at least one processor; and
   at least one memory including computer program instructions,
   the at least one memory and the computer program instructions being configured to, with the at least one processor, cause the apparatus to perform a method of determining an orientation of an object within an image, the method comprising:
     determining responses of at least two classifiers in at least one region of the image corresponding to the object, the classifiers having been trained to identify the given object in different specific orientations; and
     determining the orientation of the object as an average of the specific orientations, weighted by the responses of their respective classifiers, excluding specific orientations of classifiers having a response smaller than zero.

9. A non-transitory computer-readable storage medium comprising computer-executable instructions which, when executed by a processor, cause a computing device to perform a method of determining an orientation of an object within an image, the method comprising:
   determining responses of at least two classifiers in at least one region of the image corresponding to the object, the classifiers having been trained to identify the given
object in different specific orientations; and determining the orientation of the object as an average of
the specific orientations, weighted by the responses of
their respective classifiers, excluding specific orientations of classifiers having a response smaller than zero.

* * * * *